US012569392B2

(12) United States Patent
Chauhan et al.

(10) Patent No.: US 12,569,392 B2
(45) Date of Patent: Mar. 10, 2026

(54) INTELLIGENT HAND EXOSKELETON WITH GRASPING ASSISTANCE

(71) Applicant: Virginia Tech Intellectual Properties, Inc., Blacksburg, VA (US)

(72) Inventors: Raghuraj Chauhan, Blacksburg, VA (US); Oumar Barry, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 694 days.

(21) Appl. No.: 17/920,889

(22) PCT Filed: Apr. 22, 2021

(86) PCT No.: PCT/US2021/028662
§ 371 (c)(1),
(2) Date: Oct. 24, 2022

(87) PCT Pub. No.: WO2021/216886
PCT Pub. Date: Oct. 28, 2021

(65) Prior Publication Data
US 2023/0166391 A1      Jun. 1, 2023

Related U.S. Application Data

(60) Provisional application No. 63/013,642, filed on Apr. 22, 2020.

(51) Int. Cl.
*A61H 1/02*          (2006.01)
*B25J 9/00*          (2006.01)

(52) U.S. Cl.
CPC .......... *A61H 1/0288* (2013.01); *B25J 9/0006* (2013.01); *A61H 2201/0192* (2013.01); *A61H 2201/1659* (2013.01)

(58) Field of Classification Search
CPC ... A61H 1/0285; A61H 1/0288; B25J 9/0006; B25J 15/08
See application file for complete search history.

(56) References Cited

U.S. PATENT DOCUMENTS

| | | | | |
|---|---|---|---|---|
| 4,986,280 A | * | 1/1991 | Marcus .................... | B25J 19/02 600/595 |
| 6,110,130 A | * | 8/2000 | Kramer .................. | B25J 9/0006 600/595 |

(Continued)

FOREIGN PATENT DOCUMENTS

| | | | | |
|---|---|---|---|---|
| CN | 105943308 B | * | 4/2018 | ........... A61H 1/0285 |
| ES | 2558024 B1 | * | 11/2016 | ........... A61H 1/0288 |

(Continued)

OTHER PUBLICATIONS

Translation CN 105943308.*

(Continued)

*Primary Examiner* — Shaun R Hurley
(74) *Attorney, Agent, or Firm* — New River Valley IP Law, P.C.; Ashley M. Gates; Michele L. Mayberry

(57) ABSTRACT

A device for providing assistance in dexterous grasping operations. The device is a nine degree of freedom exoskeleton glove capable of reproducing grasping tasks present in ordinary daily activity. The device relies on series elastic actuators and a motion amplification controller for movement and support of finger joints of a user and is easily modifiable to fit individual users with different hand sizes. The user driven control scheme requires no additional hardware (e.g., camera or EMG sensors) but relies on user movements (even weak movements). Intelligent assistance prevents uncomfortable motion beyond the natural range of motion of the fingers while reacting very quickly to the user's physical input.

17 Claims, 19 Drawing Sheets

(56)                    References Cited

U.S. PATENT DOCUMENTS

| | | |
|---|---|---|
| 2010/0305717 A1 | 12/2010 | Tong et al. |
| 2013/0144195 A1* | 6/2013 | Cehic ........................ A61H 1/00 |
| | | 601/5 |
| 2016/0259417 A1 | 9/2016 | Gu |
| 2016/0296345 A1 | 10/2016 | Deshpande et al. |
| 2020/0375287 A1 | 12/2020 | Ben-Tzvi et al. |
| 2022/0079831 A1* | 3/2022 | Ahmed ................. B25J 9/1633 |

FOREIGN PATENT DOCUMENTS

| | | | | |
|---|---|---|---|---|
| WO | WO-2015174670 A1 * | 11/2015 | .............. | B25J 15/08 |
| WO | 2021216886 A3 | 12/2021 | | |

OTHER PUBLICATIONS

Translation ES 2558024.*
(Chauhan, Raghuraj et al.) Co-pending International Application No. PCT/US21/28662, filed Apr. 22, 2021, Specification, claims, and figures (see WO2021/216886).
Chauhan, R. J. and Pinhas, Ben-Tzvi, "A series elastic actuator design and control in a linkage based hand exoskeleton", Proc. ASME Dyn. Syst. Control Conf., Oct. 2019, 18 pages.
Co-pending International Application No. PCT/US21/28662, International Search Report and Written Opinion dated Nov. 4, 2021, 12 pages.
Feix, T. et al. "The GRASP Taxonomy of Human Grasp Types", IEEE Transactions on Human-Machine Systems, vol. 46, No. 1, Feb. 2016, 12 pages.

* cited by examiner

*Ball Joint*

INTELLIGENT HAND EXOSKELETON WITH GRASPING ASSISTANCE

CROSS-REFERENCE TO RELATED APPLICATIONS

This application relies on the disclosure of and claims priority to and the benefit of the filing date of U.S. Provisional Application No. 63/013,642, filed Apr. 22, 2020, the disclosure of which is hereby incorporated by reference herein in its entirety.

FIELD OF THE INVENTION

Numerous diseases or injuries affect the mobility of the human hand including stroke, brachial plexus injury, arthritis, or carpal tunnel syndrome. In the United States, at least 1.1 million people report difficulty performing ordinary grasping operations, heavily reducing their economic outlook. In some cases, such as stroke, rehabilitation is possible through repetitive motion in the affected area, whereas injury to the brachial plexus cannot be fully remedied through even surgical intervention. In this type of case, continual assistance is required to restore mobility to the hand. Therefore, a device according to embodiments of the invention can be implemented in a clinical environment for rehabilitation or as a home healthcare device which provides assistance with activities of daily living. Beyond healthcare, there exist applications in manufacturing by reducing fatigue manual laborers tasked with repetitive and dexterous tasks through continual assistance.

DESCRIPTION OF RELATED ART

Diminished hand strength and/or control is a common aspect of a variety of diseases and injuries. Physical rehabilitation for patients experiencing such symptoms, which often involves repetitive movements of the hand, can be augmented by grasp assistance devices. Comfort and usability are key factors to consider when choosing a grasp assistance device. Further, the device should be capable of reproducing at least all grasp configurations necessary to complete the tasks desired by the user.

Two of the more common types of grasp assistance devices include soft designs and rigid designs. Many commercially available devices using the soft or rigid design approaches struggle to mimic the natural motion of the fingers and thumb.

Soft designs, which typically rely on cable systems or inflatable membranes, are often inefficient as they suffer from friction between the cables and the surrounding materials or poor position control. Cable systems often result in discomfort for the user due to tension within the cable systems. Other approaches include fabric-based devices, which typically rely on their flexible structures to conform to the object being grasped. Both options are often able to achieve fewer grasp types, with reduced strength and accuracy, than their more rigid counterparts.

In contrast, rigid devices are often capable of achieving more grasp types as they are able to more effectively engage movement of the joints. The hand has 21 degrees of freedom, with four degrees of freedom per finger and five degrees of freedom in the thumb. In order to actuate all degrees of freedom, a rigid device would typically need a large number of actuators, rigid linkages, and joints. To reduce bulkiness, many devices selectively actuate only a few joints in the hand and rely on translation of force throughout the length of the finger. The translation of force provides synchronized movement of multiple joints of a finger through mechanical coupling, which can limit the number and types of grasps the exoskeleton is capable of achieving.

Identification of user intent can be an important capability in grasp assistance devices. Many devices rely on sensors, such as electromyography sensors, to determine a user's intent. Such sensors can not only add to the bulk of these devices, but can often also suffer from other drawbacks such as signal noise.

Embodiments of the invention thus provide improved grasp assistance devices, systems and methods for using them, and solutions that address one or more of these issues.

SUMMARY OF THE INVENTION

A notable feature of the inventive exoskeleton design is that it is able to achieve the wide variety of desired grasps without the need to conform to an object. Additionally, the present invention is capable of independent motion of the MCP and PIP joints of the index, middle, ring, and little fingers (by way of two actuators per finger) and flexion along the thumb. Since the device does not necessarily rely on translation of force throughout the device hardware, the device is configured to allow the fingers and/or thumb to move independently of one another, simultaneously to other fingers and/or the thumb, in sequence with other fingers and/or the thumb, and/or in the same or different directions as other fingers and/or the thumb. As such, embodiments of the inventive device are capable of achieving the finger orientations necessary to perform all 33 grasps in the GRASP taxonomy. In embodiments, the grasps can be performed without relying on grasps that conform to the shape of an object.

While exemplary embodiments of the invention are described in more detail below, a summary of certain aspects and features of such embodiments follows.

Aspect 1 is a hand exoskeleton device comprising: a dorsum base and palmer base adapted for use with a wearer's hand; one or more phalanx pad(s); one or more actuator(s) disposed in operable communication with one or more of the phalanx pad(s) and the dorsum base; and optionally, a motion amplification controller in operable communication with one or more of the actuator(s) and capable of controlling movement of one or more finger(s) or a thumb of the wearer's hand.

Aspect 2 is the device of Aspect 1, wherein one or more of the actuator(s) is a series elastic actuator.

Aspect 3 is the device of Aspect 1 or 2, wherein the actuators comprise first and second actuators in operable communication with each finger of the wearer's hand.

Aspect 4 is the device of any of Aspects 1-3, wherein the first actuator is disposed in operable communication with a first phalanx pad (e.g., support) in a manner to affect a metacarpophalangeal joint of a finger of the wearer and the second actuator is disposed in operable communication with a second phalanx pad in a manner to affect a proximal interphalangeal joint of a finger of the wearer.

Aspect 5 is the device of any of Aspects 1-4, wherein the actuators comprise a thumb actuator affecting a carpometacarpal flexion joint and a metacarpophalangeal joint of a thumb of the wearer's hand.

Aspect 6 is the device of any of Aspects 1-5, wherein the adduction/abduction degrees of freedom of all fingers of the wearer's hand are passive and located on the dorsum base.

Aspect 7 is the device of any of Aspects 1-6, wherein the device is configured to be affixed to the wearer's hand at one or more finger phalanxes, dorsum, and/or palm.

Aspect 8 is the device of any of Aspects 1-7, further comprising a glove configured for indirectly affixing the device to the wearer's hand.

Aspect 9 is the device of any of Aspects 1-8, wherein the motion amplification controller is configured to enforce one or more equations of motion on one or more of the actuator (s).

Aspect 10 is the device of any of Aspects 1-9, wherein the motion amplification controller is configured to control movement of one or more finger(s) and/or a thumb of the user/wearer's hand.

Aspect 11 is the device of any of Aspects 1-10, wherein the motion amplification controller is configured to determine a force needed to move one or more finger(s) or thumb of the wearer's hand.

Aspect 12 is the device of any of Aspects 1-11, wherein the motion amplification controller is configured to amplify an input motion from the wearer's hand, providing assistance in grasping an object.

Aspect 13 is an actuator for a finger exoskeleton device, comprising: a leadscrew configured for attachment to a motor assembly; a lead nut; one or more compression spring(s); and a housing; wherein rotation of the leadscrew is capable of causing linear motion of the motor assembly, with the lead nut held in place by one or more of the compression spring(s), wherein optionally the actuator of any of Aspects 13-15 or 20 can be used as the actuator in any of the devices of Aspects 1-12, 16-19, or 21-26, or in any of the methods of Aspects 26-27.

Aspect 14 is the actuator of Aspect 13, wherein a force exerted on the actuator is transmitted from an external load to one or more of the compression spring(s) to the housing.

Aspect 15 is the actuator of Aspect 13 or 14, further comprising one or more linear potentiometer(s) for measuring a position of the actuator and/or extent of compression of one or more of the compression spring(s).

Aspect 16 is the device of any of Aspects 1-12, wherein the motion amplification controller is capable of reversing direction and is capable of ceasing movement upon either a lack of continued input from the wearer or input in the direction opposite current motion.

Aspect 17 is the device of any of Aspects 1-12 or 16, wherein the motion amplification controller comprises a virtual sliding spring base to enable the reversing and/or ceasing of movement.

Aspect 18 is the device of any of Aspects 1-12, 16 or 17, wherein spring deflection, alpha, autonomously approaches zero (see FIG. 5).

Aspect 19 is the device of any of Aspects 1-12, or 16-18, wherein smooth operation of the device is enabled by a nonlinear damping manifold, beta, which allows the device to smoothly observe a natural range of motion of the wearer in that the nonlinear damping manifold is capable of providing infinite resistance as any finger joint attempts to exceed its limits.

Aspect 20 is the actuator of any of Aspects 13-15, wherein the housing is configured to house the motor assembly, lead nut, and the one or more compression spring(s).

Aspect 21 is a wearable assistive device comprising: a first support base configured for securement to a user's body or extremity; a second support base configured for securement to the user's extremity; and an actuator having a first end in direct or indirect communication with the first support base and a second end in direct or indirect communication with the second support base; wherein the actuator is capable of acting as a lever for activating movement of the second support base and consequently a joint of the extremity which joint is disposed between the first and second support base when worn; optionally, a motion amplification controller in operable communication with the actuator and capable of controlling movement of the extremity at the joint, wherein optionally the actuator of Aspect 21 can be the actuator of any of Aspects 13-15 or 20, and optionally any one or more features of the device of Aspect 21 can be further defined by any one or more features of any of the devices of Aspects 1-12, 16-19 or 22-25.

Aspect 22 is hand exoskeleton device comprising: one or more base adapted for use with a wearer's hand; one or more finger connector(s) for connection to a wearer's finger(s); one or more actuator(s) disposed in operable communication with one or more of the finger connector(s) and the one or more base; and optionally a motion amplification controller in operable communication with one or more of the actuator (s) and capable of controlling movement of one or more finger(s) or a thumb of the wearer's hand, wherein optionally the actuator of Aspect 22 can be the actuator of any of Aspects 13-15 or 20, and optionally any one or more features of the device of Aspect 22 can be further defined by any one or more features of any of the devices of Aspects 1-12, 16-19, 21 or 23-25.

Aspect 23 is a hand exoskeleton device comprising: one or more base adapted for use with a wearer's hand; up to four finger mechanisms, each comprising: two phalanx pads; two actuators each disposed in operable communication with one of the phalanx pads and one or both actuators disposed in operable communication with the base; and one or more linkage lengths connecting each phalanx pad to one of the actuators; a thumb mechanism comprising: a thumb base; a thumb phalanx pad; and an actuator disposed in operable communication with the thumb phalanx pad and the base; and optionally, a motion amplification controller in operable communication with the actuators and capable of controlling movement of one or more or all fingers and/or a thumb of the wearer's hand, wherein optionally the actuator of Aspect 23 can be the actuator of any of Aspects 13-15 or 20, and optionally any one or more features of the device of Aspect 23 can be further defined by any one or more features of any of the devices of any of Aspects 1-12, 16-19, 21-22 or 24-25.

Aspect 24 is a hand exoskeleton device comprising: a base adapted for use with a wearer's hand; two phalanx pads configured for attachment to a finger of the wearer's hand; two actuators each disposed in operable communication with one of the phalanx pads and one or both actuators disposed in operable communication with the base; and optionally, a motion amplification controller in operable communication with both of the actuator and capable of controlling movement of the finger of the wearer's hand; wherein each actuator is configured to control motion of one of the phalanx pads, wherein optionally the actuator of Aspect 24 can be the actuator of any of Aspects 13-15 or 20, and optionally any one or more features of the device of Aspect 24 can be further defined by any one or more features of any of the devices of Aspects 1-12, 16-19, 21-23 or 25.

Aspect 25 is a hand exoskeleton device comprising: a base adapted for use with a wearer's hand; a phalanx pad configured for attachment to a thumb of the wearer's hand; an actuator disposed in operable communication with the phalanx pad and the base; and optionally, a motion amplification controller in operable communication with the actuator and capable of controlling movement of the thumb of the wearer's hand, wherein optionally the actuator of Aspect 25 can be the actuator of any of Aspects 13-15 or 20, and optionally any one or more features of Aspect 25 can be further defined by any one or more features of any of the devices of Aspects 1-12, 16-19 or 21-24.

Aspect 26 is the device of any of Aspects 1-12, 16-19 or 21-25, wherein the motion amplification controller is configured to impart the following equations of motion on one or more actuator:

$$\dot{x}_1 = x_2; \dot{x}_2 = -\alpha x_1 - b(\vec{x})x_2 \quad \alpha > 0$$

$$b(\vec{x}) = \frac{\exp\left(\tan^{-1}(-x_1')\tan^{-1}(x_2)\right)}{x_{1max}'|x_1'|}$$

$$\dot{\vec{x}} = \begin{bmatrix} 0 & 0 & 1 & 0 \\ -\alpha & -b(\vec{x}) & \alpha & 0 \\ 0 & 0 & 0 & 1 \\ \alpha & 0 & -\alpha & -\beta \end{bmatrix}\begin{bmatrix} x_1 \\ x_2 \\ x_3 \\ x_4 \end{bmatrix}$$

wherein $x_1$ is a spring deflection in the actuator and a is a virtual spring constant;

wherein the spring deflection is calculated as $x_1'-x_{1ref}'$; and wherein $b(\vec{x})$ is a nonlinear damping term.

Aspect 27 is the device or actuator of any of Aspects 1-26 for use in a method of assisting movement of one or more extremities, the method comprising: actuating one or more components of the device in a manner to cause movement of the extremity at one or more joints, such as to grasp an object.

Aspect 28 is the device or actuator of Aspect 27 for use in a method of assisting movement of one or more extremity, the method further comprising: actuating one or more components of the device in a manner to reverse the movement, such as to release the grasp of the object.

BRIEF DESCRIPTION OF THE DRAWINGS

The accompanying drawings illustrate certain aspects of embodiments of the present invention, and should not be used to limit the invention. Together with the written description, the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Exoskeleton

Figure 1:
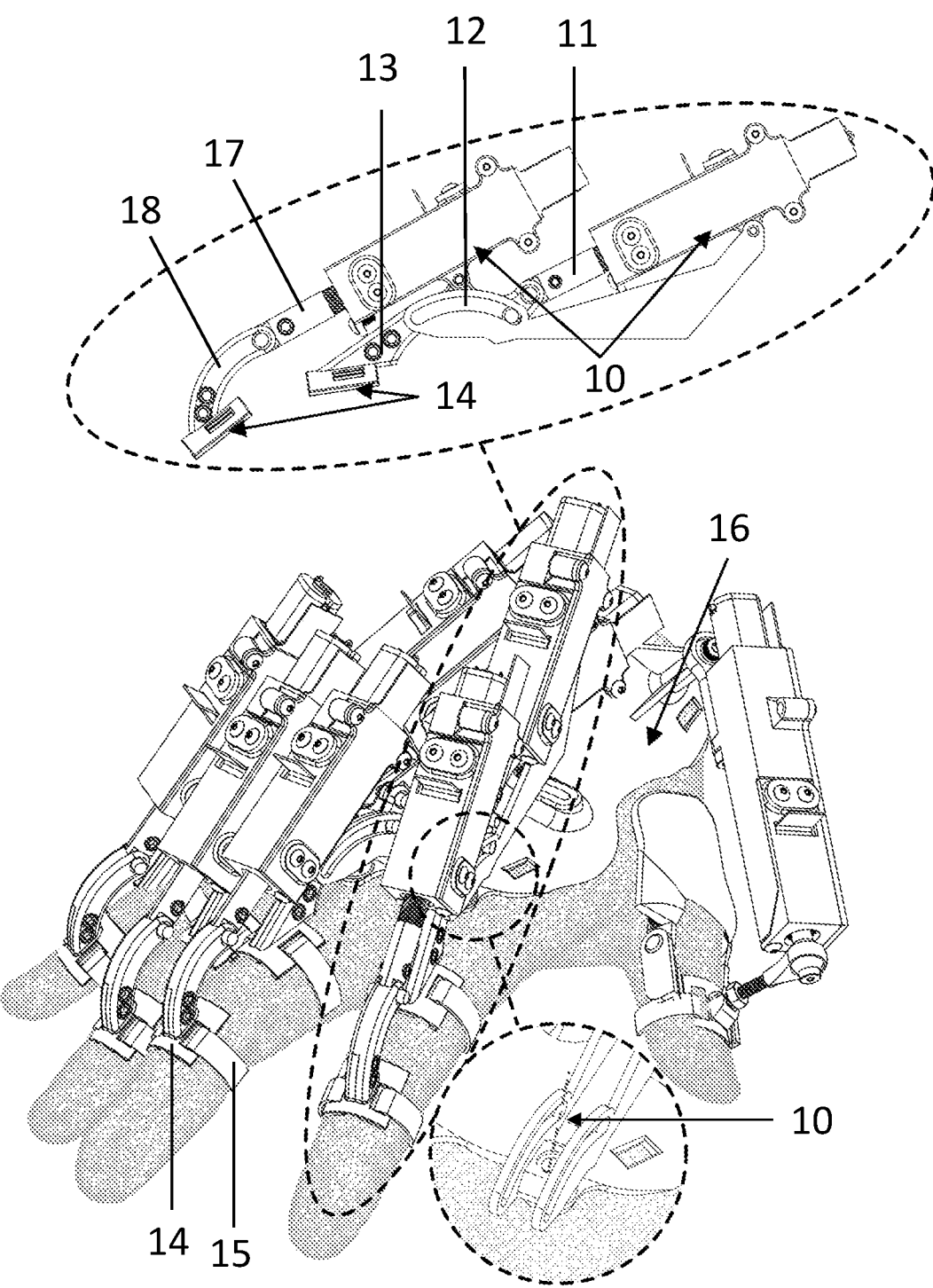
FIG. 1 is a drawing showing an exemplary exoskeleton design on the hand of a wearer/user, showing the finger mechanism layout in the top detail view and the axis of rotation for the adduction/abduction (ad/ab) in the bottom detail view.

In embodiments of the invention, the device comprises a nine degree of freedom exoskeleton capable of reproducing grasping tasks present in ordinary daily activity. An exemplary exoskeleton design according to an embodiment of the invention is shown in FIG. 1. The figure shows the finger mechanism layout of the exoskeleton in the top detail view and the axis of rotation for the adduction/abduction (represented by a dashed line) in the bottom detail view. The finger mechanism comprises one or more actuators 10 that are capable of being connected to a finger by one or more phalanx pads 14. In embodiments, one or more of the phalanx pads 14 are configured to be secured to the fingers with connectors 15 ($F_1$, $F_2$) or harnesses that extend around the fingers either partially or fully. In embodiments, the connectors 15 are comprised of plastic, metal, fabric, elastic, leather or combinations thereof and are capable of securing the device to the fingers (or to a glove to be disposed on a finger), such as by way of hook and loop fasteners, straps, magnets, adhesive, buckles, snaps, zippers, hook and eye fasteners, fabric ties (such as threading laces through eyelets or loops), and/or combinations thereof.

Figure 2A:
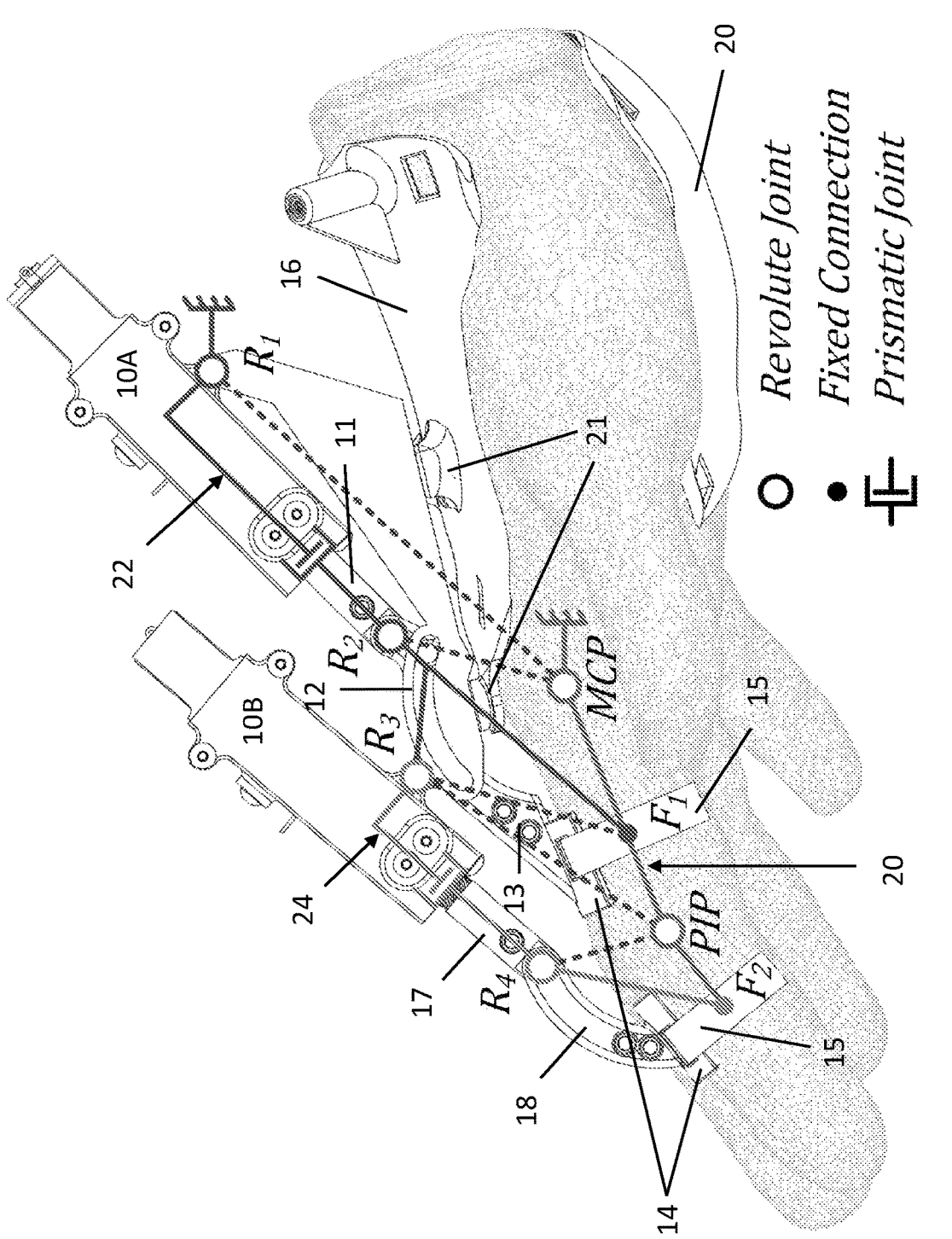
FIG. 2A is a drawing showing the kinematic chains for the finger, MCP actuation, PIP actuation, and virtual lengths for an embodiment of the invention.
Figure 2B:
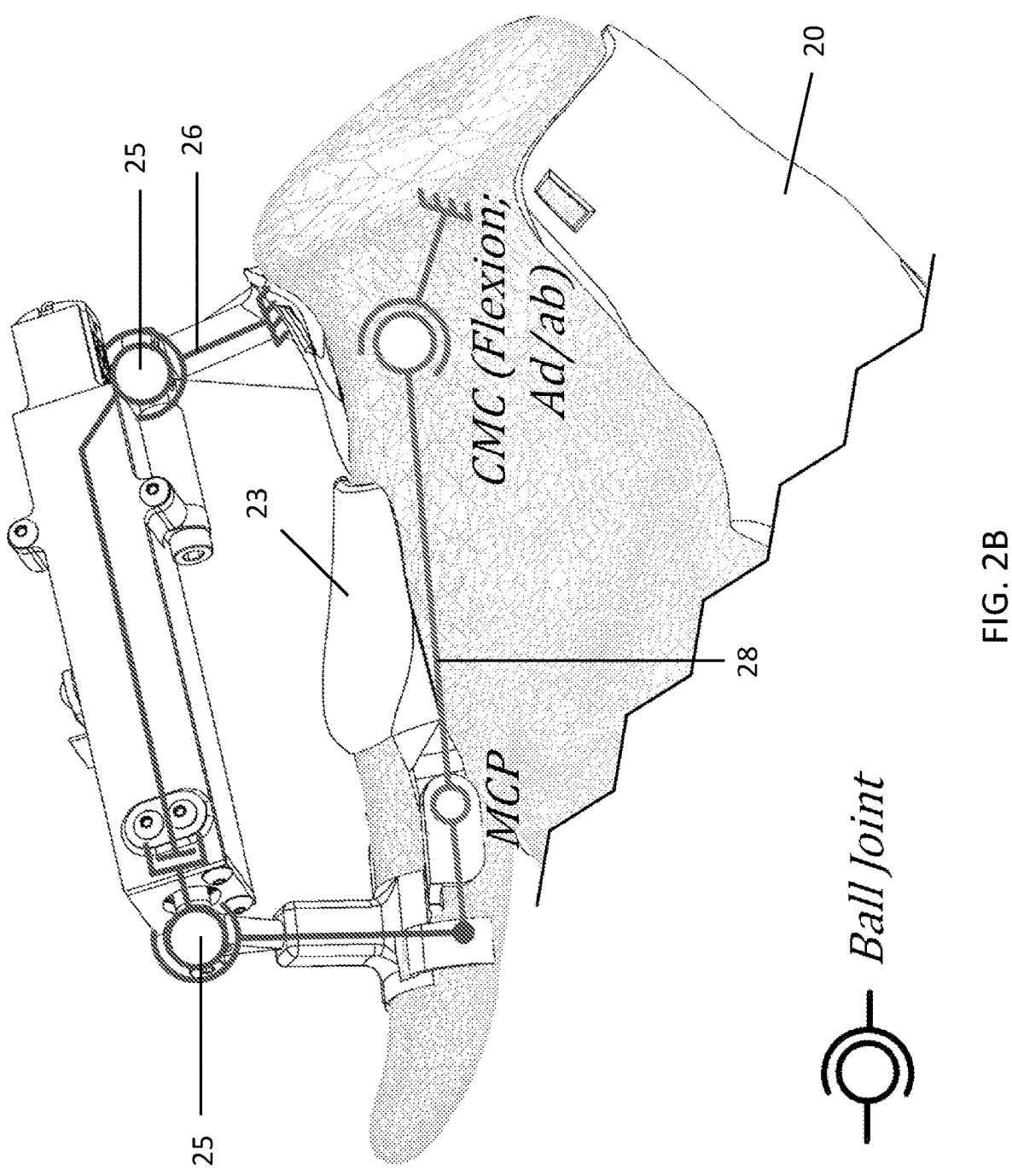
FIG. 2B is a drawing showing an exemplary thumb mechanism kinematic structure with ball joints in the actuation chain and as an approximation of the adduction/abduction (ad/ab) and CMC joints thumb chain.

A finger mechanism according to an embodiment of the invention is shown in FIG. 2A. In this embodiment, the device exoskeleton comprises two support pieces/components, the dorsum 16 and palmar 20 bases, that are capable of being attached firmly to the wearer's hand (or to a glove to be worn by a user/wearer). To ensure comfort and proper interaction between the device and user, the pieces/components can be designed to conform to the wearers anatomy. A first actuator 10A is attached to the dorsum base 16 at one or more connection point(s) 21. The first actuator 10A is connected to one or more phalanx pads 14 by way of one or more linkage lengths 11, 12, and/or 13, wherein the linkage lengths 11-13 are separated by one or more revolute joints $R_2$ and/or $R_3$. The first actuator 10A is connected to a second actuator 10B by way of revolute joint $R_3$. The second actuator 10B is further connected to linkage lengths 17 and 18, wherein the linkage lengths 17 and 18 are separated by a revolute joint $R_4$. In embodiments, the device can include a thumb base 23 (FIG. 2B). In embodiments, the pieces can be custom-made for the wearer. In other embodiments, the pieces are adjustable such that the device is configured to adjust to fit multiple wearers. In an embodiment, one or more of the linkage lengths 11-13, 17, and/or 18 (and/or linkage length(s) for the thumb) are configured to be shortened and/or extended while the device is fully and/or partially assembled. In other embodiments, one or more of the linkage lengths 11-13, 17, and/or 18 (and/or linkage length(s) for the thumb) are interchangeable with replacement links of the same or different sizes. In embodiments, the dorsum 16 and palmar 20 bases are part of a single base that wraps around the hand. In other embodiments, no base is present on the palm. In embodiments, the device comprises revolute joints $R_1$-$R_4$.

FIGS. 2A-B show exemplary linkage mechanism layouts for the index, middle, ring, and little (IMRL) fingers and the thumb. The finger design is such that for one or more of the IMRL digits there are one or more actuators for affecting (e.g., providing assistance with flexion and/or extension) the metacarpophalangeal (MCP) and/or proximal interphalangeal (PIP) joints as shown in FIG. 2A. FIG. 2A also shows the kinematic chains for the finger 20, MCP actuation 22, and PIP actuation 24. Virtual lengths are depicted using dashed lines. In an embodiment of the invention, on the thumb, there is one actuator comprising two ball joints 25 that affects both the carpometacarpal (CMC) flexion and MCP joint as shown in FIG. 2B. The thumb mechanism kinematic structure with ball joints in the actuation chain 26 and as an approximation of the adduction/abduction (ad/ab) and CMC joints thumb chain 28 are also shown in FIG. 2B. As shown in FIG. 1, the adduction/abduction (ad/ab) degrees of freedom (DOF) of all fingers are passive and located on the dorsum base 16 above the wearer's own MCP. In embodiments, the device is capable of moving fingers and/or thumb up and down, side to side, and rotating them clockwise or counterclockwise. In some embodiments the fingers and/or thumb can move independently of one another, simultaneously to other fingers and/or the thumb, in sequence with other fingers and/or the thumb, and/or in the same or different directions as other fingers and/or the thumb.

Figure 3:
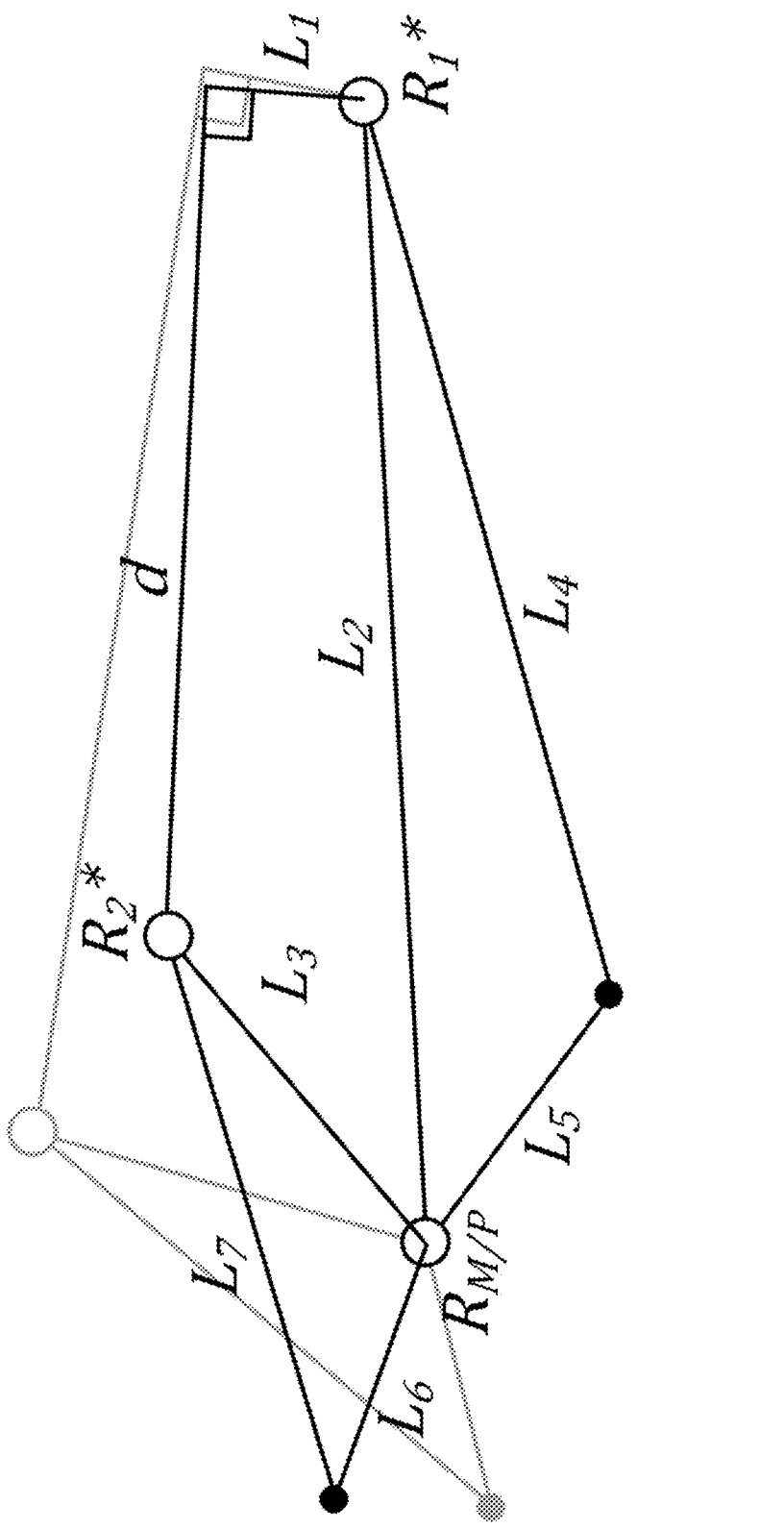
FIG. 3 is a diagram showing a detailed, typical structure for an embodiment of the two mechanisms on the IMRL fingers with an extended configuration.

Affixing of the device/exoskeleton to a wearer at the finger phalanxes, dorsum, and/or palm leads to the assumption that link lengths, excluding the actuator length d, are constant (FIG. 3). Since the prototype was designed to fit the hand of a particular user, for a comfortable fit onto another user, $L_2$ and $L_3$ could be changed in order to ensure proper ROM is achievable at the respective joint (MCP/PIP joints, shown as $R_{M/P}$ in FIG. 3). The lengths $L_5$ and $L_6$ are directly the half phalanx lengths of the respective fingers. The remaining lengths ($L_1$, $L_4$, $L_7$) are design choices to allow the actuator and the rotating linkages to fit. In embodiments, the dorsum and palmar pieces could also be made to conform to a particular wearer's hand shape or size to provide a more comfortable and/or secure fit.

Figure 4A:
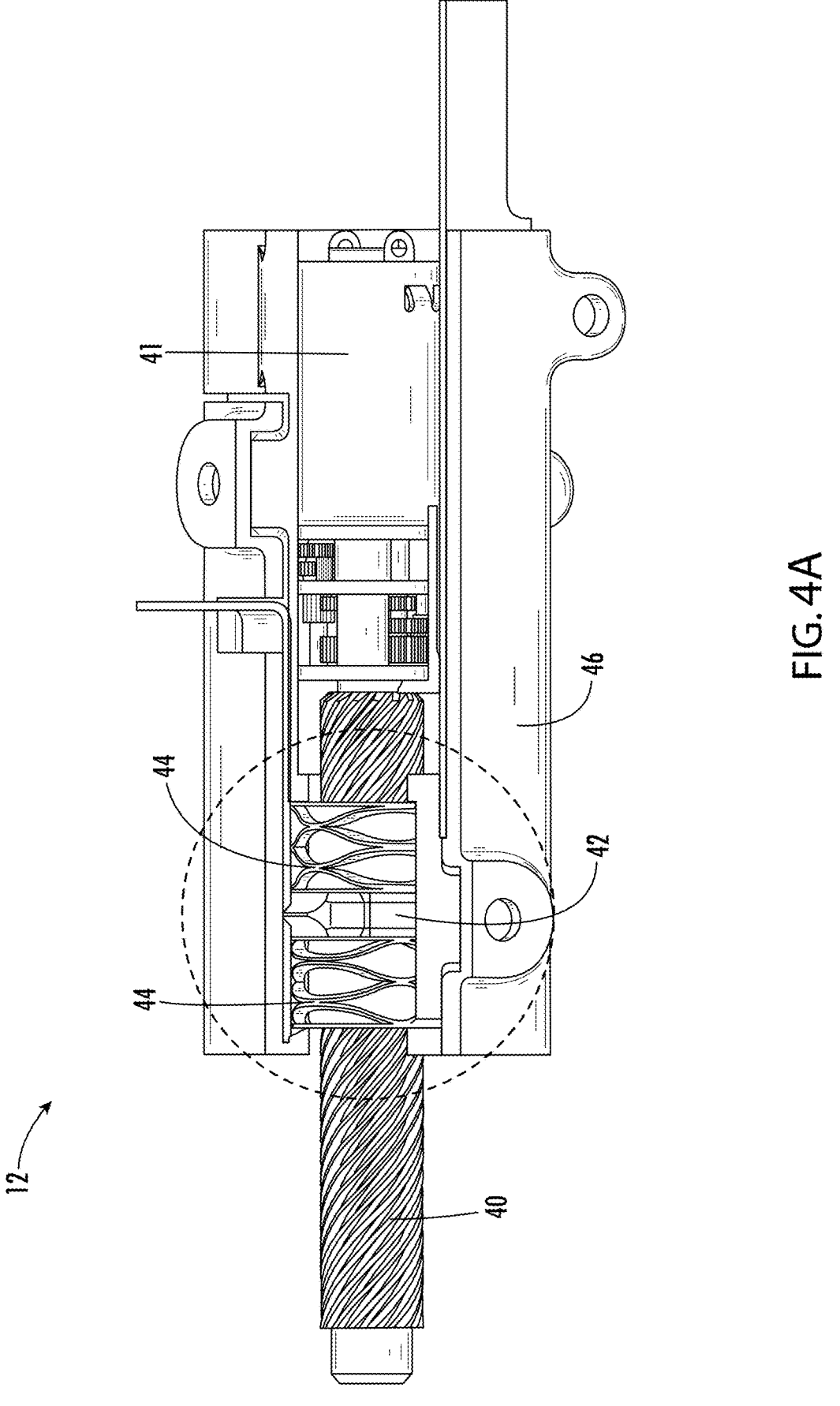
FIG. 4A is a schematic showing a section view of the actuator showing the housing, motor, leadscrew, lead nut, springs, and potentiometers for an embodiment of the invention.

The series elastic actuator (SEA) 10 used in the finger mechanism according to an embodiment of the invention as shown in FIG. 4A (another example of a series elastic actuator that could be compatible with embodiments of the device can be found in U.S. Patent Publication No. 2020/0375287, which publication is hereby incorporated by reference in its entirety). The rotation of the leadscrew 40 attached to the motor causes the linear motion of the motor assembly 41 with the nut 42 being held in place by the compression springs 44. The external force on the screw 40 compresses the springs 44. In embodiments, the actuators can comprise linear potentiometer(s) to measure the actuator position (used to determine the finger joint angle) and the spring compression (user intention). In other embodiments, user intent can be determined using other sensor types, such as electromyography (EMG) sensors, force sensors, finger joint position sensors, and/or combinations of sensor types. In embodiments, the device can deliver feedback to a user by way of one or more haptic feedback mechanism(s). Other actuators can be used, alternatively or in addition, such as a direct drive motor with accurate current sensing and/or a pneumatic actuator. Given the space and weight constraints for design of a device for the hands, however, in some circumstances such actuators may add undesirable size and/or weight, but could be used in other applications, such as with legs.

Figure 4B:
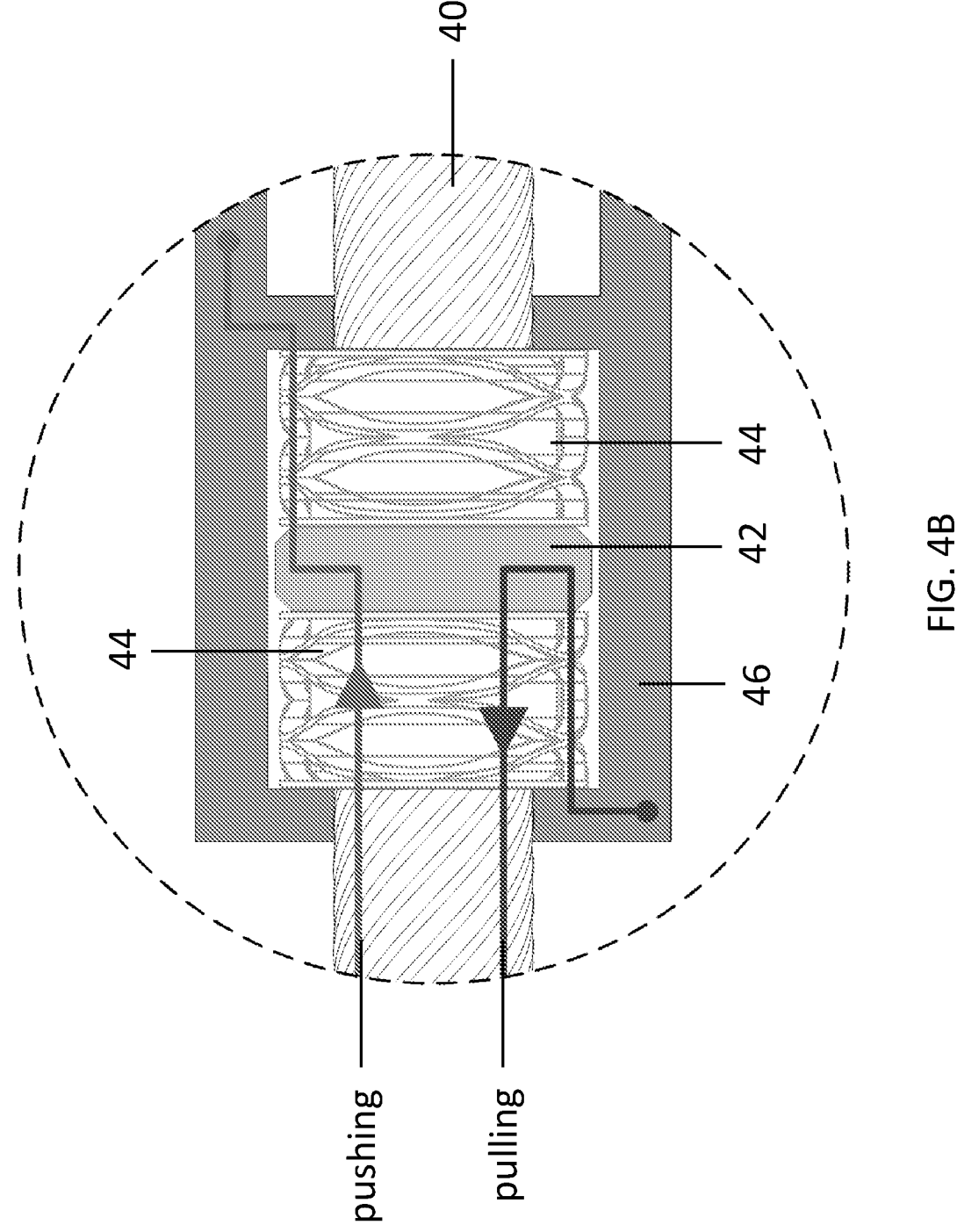
FIG. 4B is a schematic showing the detailed section indicated by the dashed circle in FIG. 4A. The pushing and pulling load paths are shown with their directions indicated by the arrows and the force transfer into the housing indicated by the dots.

The load paths for the pushing and pulling forces are shown in FIG. 4B. The force is directly transmitted from the external load to the compression springs 44 to the housing 46. This layout prevents the motor assembly 41 from experiencing any of the external load while allowing a more compact assembly.

Motion Amplification Controller

According to embodiments of the invention, a motion amplification controller can be programmed to control the exoskeleton or parts thereof to perform particular motions, such as any one or more or all of the 33 configurations of the GRASP taxonomy. The controller can be used in combination with any number of other controllers, such as low-level controllers, to cause the device/exoskeleton/wearer to perform a particular motion, such as a particular grasp. The controller can be programmed to enforce any one or more or all of the following equations of motion on one or more of the actuator(s) for the fingers or thumb:

$$\dot{x}_1 = x_2; \dot{x}_2 = -\alpha x_1 - b(\vec{x})x_2 \quad \alpha > 0 \qquad \text{Equation (1)}$$

$$b(\vec{x}) = \frac{\exp\left(\tan^{-1}(-x_1')\tan^{-1}(x_2)\right)}{x_{1max}' - |x_1'|} \qquad \text{Equation (2)}$$

where $x_1$ is the spring deflection in the SEA and a is the virtual spring constant. The spring deflection is calculated as $x_1'$-$x_{1ref}'$ (see FIGS. 5A-B). The nonlinear damping term $b(\vec{x})$ forces the system to remain within the fingers ROM. The damping force increases as the actuator's position, $x_1'$, approaches towards the physical limit, $x_{1max}'$.

9

Figure 5A:
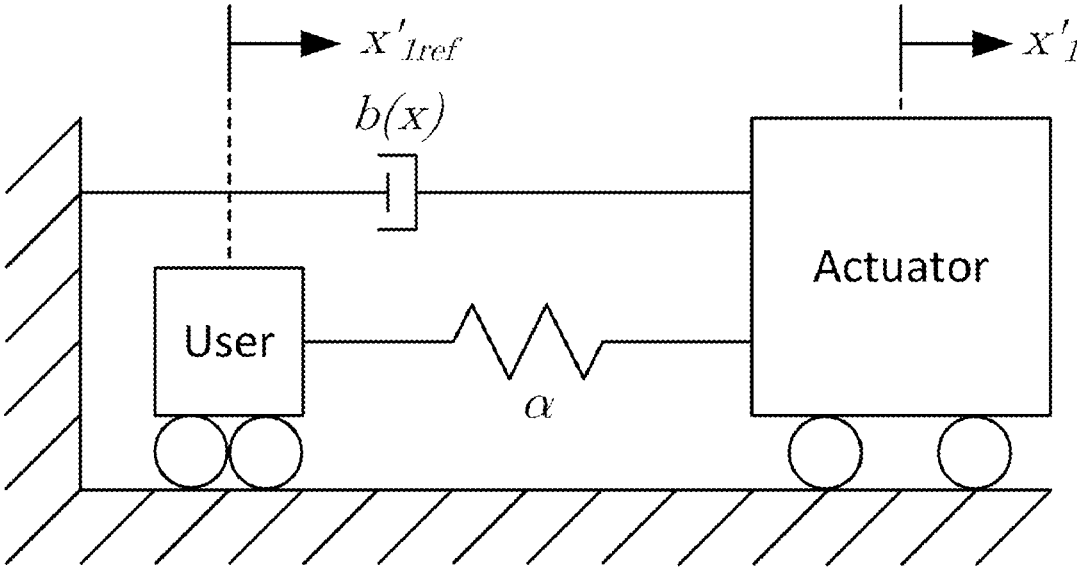
FIG. 5A is a diagram showing an exemplary system used to control the SEA.
Figure 5B:
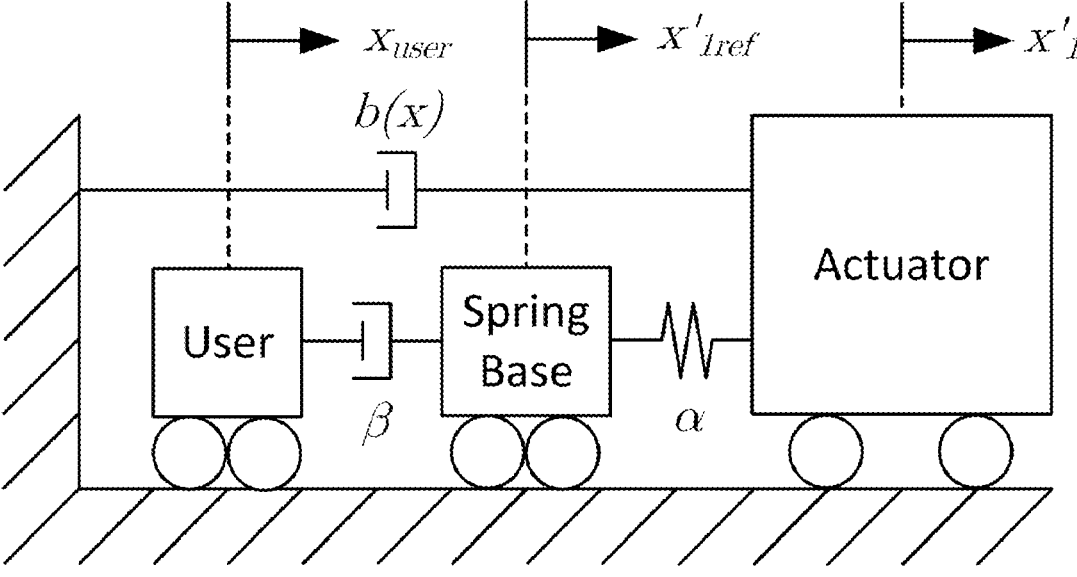
FIG. 5B is a diagram showing the modified dynamical system, with a shifting spring base, used to control the SEA for an embodiment of the invention.
Figure 12:
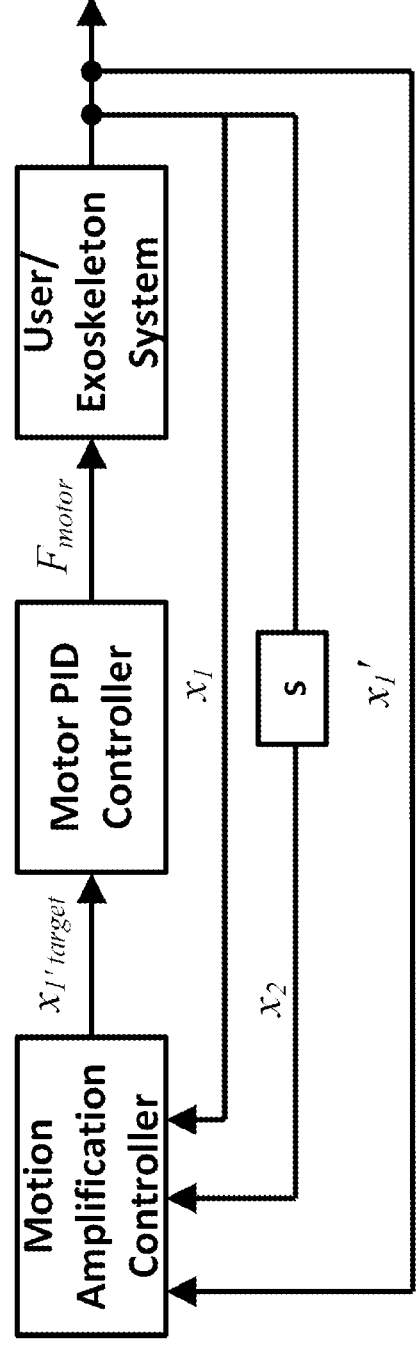
FIG. 12 is a diagram showing the data flow between the user/exoskeleton system, motor PID controller, and the motion amplification controller of embodiments of the invention.

In embodiments, as shown in FIG. 5A, the system generates a force on the actuator based on the virtual spring, α, and nonlinear damper, $b(\vec{x})$. In embodiments, the controller can be worn by the user/wearer of the exoskeleton, such as on the user/wearer's hand or other part of the user/wearer's body, or the controller can be located remote to the user/exoskeleton. In embodiments, the controller can be connected to the exoskeleton either wirelessly or through a wired connection in a manner such that the controller is capable of providing instructions to generate the particular force desired of the actuator and causing the actuator to perform the desired function/motion. The virtual spring in this system directly connects the user/wearer and the actuator while the real force is transmitted from the actuator to the user/wearer by the physical springs in the SEA. The issue in this realization is that for the user to reverse the direction of the actuator, the spring (virtual and physical) must be deflected back to its equilibrium position. However, by allowing the end of the virtual spring not connected to the wearer to shift slowly towards the wearer, the location of the virtual equilibrium position can be brought closer to the wearer and the direction can be changed more quickly. To allow this, the system can be considered as what is shown in FIG. 5B. By choosing the parameters α and β, the dynamics of the spring base can be made slower than the actuator itself so the motion amplification is still in effect. Mathematically, the system is $$\dot{\vec{x}} = \begin{bmatrix} 0 & 0 & 1 & 0 \\ -\alpha & -b(\vec{x}) & \alpha & 0 \\ 0 & 0 & 0 & 1 \\ \alpha & 0 & -\alpha & -\beta \end{bmatrix} \begin{bmatrix} x_1 \\ x_2 \\ x_3 \\ x_4 \end{bmatrix} \qquad \text{Equation (3)}$$

where $x_1$ is $x_1'$ and $x_3$ is $x_{1ref}'$. In implementations, this can be realized by using a low-pass filter on the spring base based on the actuator position as the input. The system is inherently stable given that the virtual spring and damping coefficients are strictly positive. The time constant for the filter can be chosen to be large based on the assumption that the motion of the wearer is slow. In embodiments, the value is conservatively chosen as 1.5 seconds so as to be slower than the actuator which takes approximately 0.5 seconds to completely travel a finger joint's ROM. In other embodiments, the time constant for the filter is in the range of 0.5 seconds to 3 seconds, such as 0.75 seconds, 1 second, 1.25 seconds, 1.75 seconds, 2 seconds, 2.25 seconds, 2.5 seconds, or 2.75 seconds. The value of $x_2$ is integrated twice to determine a reference position that is input into a low-level PID controller responsible for moving the actuator itself, running on the microcontroller unit (MCU). FIG. 12 shows the data flow between the user and various components of the device. The user applies a force to the exoskeleton system by moving one or more finger(s). The motion amplification controller and the spring, s, receive information from one or more sensors relating to this force. The actuator's position, $x_1'$, the spring deflection in the actuator, $x_1$, and $x_2$ (the "s" term is used to obtain $x_2$ from $x_1$ using differentiation) are used to instruct the motor PID controller of a target position for the actuator to enable the device to achieve, $x_{1target}$. The motor PID controller instructs the motor of the actuator, such as an SEA, to provide a certain amount of force (Fmotor) to the exoskeleton system/device, to assist the user with the desired grasp. Intelligent assistance prevents uncomfortable motion beyond the natural range of motion of the fingers while reacting very quickly to the user's physical input. In embodiments, the motion amplification controller operates to move the user's hand in response to some movement from the user that triggers the controller to further assist with the movement. The range of motion can be limited by the damping manifold in Equation 2.

The motion amplification controller and PID controller can comprise computer programs comprising computer executable instructions, which when the program is executed by a computer, cause the computer to carry out any one or more of the processes, methods, and/or algorithms according to the above. The computer-executable instructions can be programmed in any suitable programming language, including JavaScript, C, C#, C++, Java, Python, Perl, Ruby, Swift, Visual Basic, and Objective C. Also provided herein is a non-transitory computer-readable medium (or media) comprising computer-executable instructions, which when executed by a computer, cause the computer to carry out any of the processes, methods, and/or algorithms according to the above. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include one or more sets of computer-executable instructions for providing an operating system as well as for implementing the processes, methods, and/or algorithms of the invention.

In embodiments, the device/exoskeleton is capable of providing assistance in flexion, extension, adduction, and/or abduction of one or more joints to any degree of rotation within the natural ROM of said joint. The device can provide assistance relative to one or more joints of any extremity, or all joints of the extremity. With respect to the hands, the device can be adapted to assist movement by affecting one or more or all of the MCP, PIP and/or DIP joints of the fingers and/or thumb. For example, the device can provide assistance in MCP abduction in the range of 0° to 25°, MCP adduction in the range of 20° to 0°, MCP flexion in the range of 0° to 90°, and MCP extension in the range of 0° to 30°. In embodiments, the device can provide flexion of the PIP joint between 0° and 120° and/or extension of the PIP joint between 120° and 0°. In embodiments, such as by including an actuator and support base(s) for assisting movement of the DIP joint, the device can provide flexion of the DIP joint of the finger between 0° and 80° and extension of the DIP joint between 80° and 0°. Motion of the DIP joint can also be passive as a result of assisted movement of the PIP joint. Further the device is capable of providing rotation of the MCP joint of the thumb as follows: abduction between 0° and 50°, adduction between 40° and 0°, flexion between 0° and 70°, and/or extension between 60° and 0°. Further, the device is capable of providing flexion of the IP joint of the thumb between 0° and 90° and/or extension of the thumb between 90° and 0°. In embodiments, the device can be modified accordingly to meet motion needs for any joint, for any extremity, and for any desired application. For example, the range of motion described above for the PIP joint of a finger can be applied to a device adapted for use with a leg and for assistive motion at the knee. Likewise, the range of motion described above for the MCP joint can be applied to a device adapted for use with a leg and for assistive motion at the hip.

In embodiments, a maximum degree of joint rotation (for each joint receiving assistance) can be set for a user to prevent uncomfortable motion beyond the user's current range of motion. For example, in a patient experiencing reduced range of motion of one or more joints, the maximum degree of joint rotation of the one or more affected joints can be slowly increased as the user regains flexibility. In another embodiment, the device can be programmed with a predetermined set of values for range of motion based on user parameters such as age, sex, prior injury, disease presence, and/or dominant vs. non-dominant hand. The predetermined set values can be re-adjusted at any time according to a particular user/wearer's needs and as those need may change over time.

In embodiments, the device is capable of providing grasp assistance to lift objects weighing in the range of 1 g to 5 kg, such as 2 g, 5 g, 10 g, 50 g, 100 g, 250 g, 500 g, 1 kg, 2 kg, 3 kg, 4 kg, or 4.5 kg. In embodiments, the device is capable of augmenting the force applied by the user to assist with lifting objects having appreciable weight. For example, the controller can be adapted to be capable of weight sensing, which could rely on determining the orientation of the hand relative to an object, and/or capable of slip detection by incorporating appropriate slip detection sensors and a controller adapted for tighter pinching.

In embodiments, the device is capable of being used with and/or incorporated into other devices/systems capable of providing movement assistance, such as assistance to the wrist, elbow, and/or shoulder. In embodiments, the device is capable of being used with artificial limbs.

In embodiments, the device is capable of modification to provide support to any number of fingers (to include the thumb, index, middle, ring, and/or little fingers) of the hand, such as 1, 2, 3, 4, and/or 5. In embodiments, the device does not include support to the thumb. In other embodiments the device can be adapted for use with the foot (shorter linkage lengths, fewer or additional actuators, etc.), or can be modified accordingly to control other limbs such as arms or legs, such as by affixing a first actuator to control movement of a leg at the hip, a second actuator to control movement of the leg at the knee, and/or a third actuator to control movement of a foot at the ankle. Similar modifications can be made to control movement of the arms.

Exemplary Device/System Integration

Figure 6:
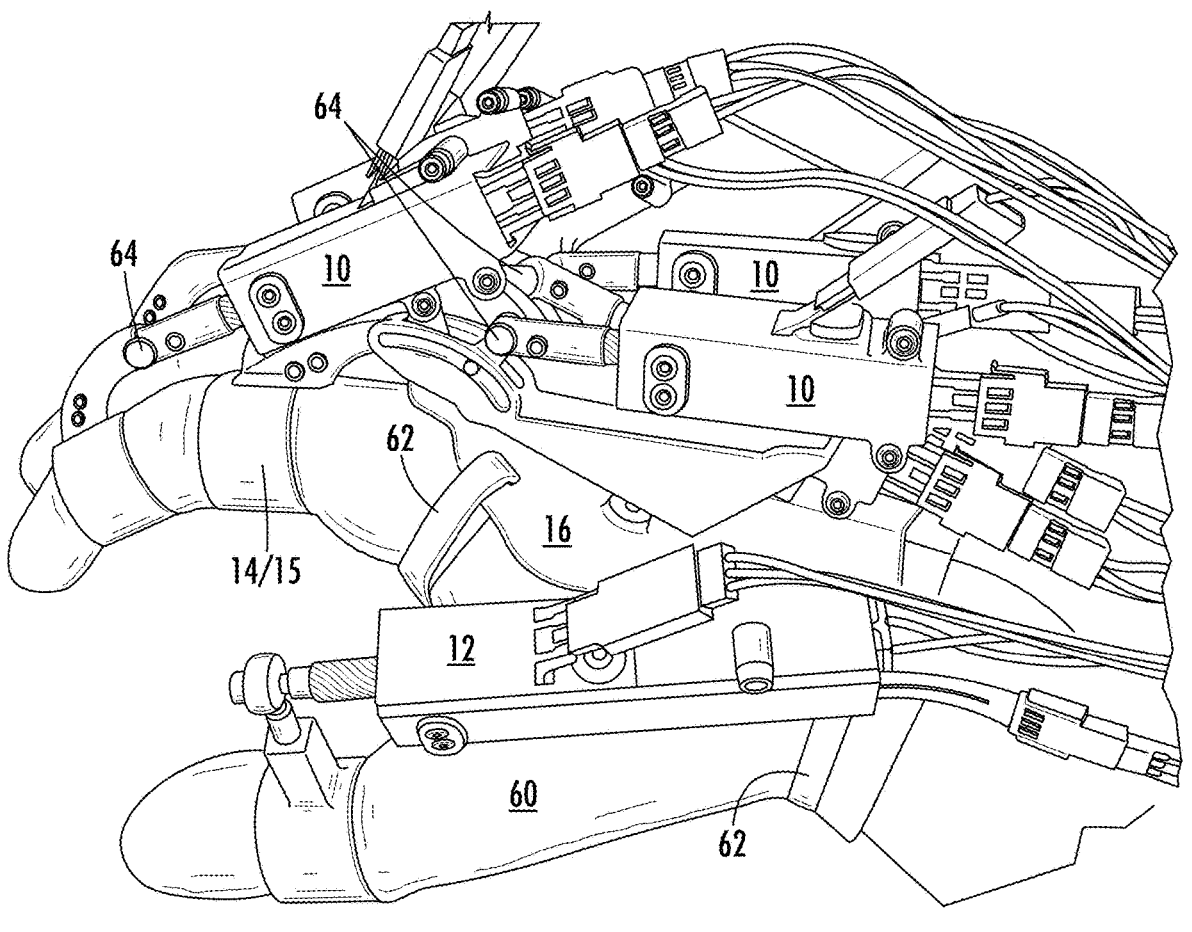
FIG. 6 is a photograph showing an exemplary exoskeleton glove as worn by a user.

An embodiment of the device/system is shown in FIG. 6. The entirety of the base and a majority of the actuator 12 were fabricated from 3D printed polyacetic acid (PLA). In embodiments, the 3D printed pieces can be made from any 3D-printable material including but not limited to, acrylonitrile butadiene styrene (ABS), acrylic styrene acrylonitrile (ASA), polyamide (nylon), polyethylene terephthalate (PET), glycol modified PET (PETG), polycarbonate, carbon fiber-containing filaments, and/or combinations thereof. Components of the device/system can be prepared by any manufacturing methods, including by CNC fabrication or molding. In embodiments, the dorsal 16 and palmar 20 bases are configured to be attached to a glove 60 to improve comfort and donning and doffing speed. In embodiments, the device is attached to a glove through an adhesive, sewn to the glove, and/or reversibly attached to the glove (such as by hook and loop fasteners). In other embodiments, the device is configured to be secured directly to a user's hand, such as by straps, belts or clips. In some embodiments, a protective layer, such as a glove, can be placed on the hand prior to securing the device and the device can be secured to the glove as well or just used as in intermediate between the device and the user's hand to which the device is attached. The glove can be made from cloth, plastic, rubber, metal, leather, or other suitable materials and any combination of these. In embodiments, the bases are secured by tensioning hook and loop straps 62 as shown in FIG. 6. In other embodiments, the bases are secured by other mechanisms such as straps, buckles, snaps, zippers, hook and eye fasteners, fabric ties (such as threading laces through eyelets or loops), and/or combinations thereof. As previously stated, these two pieces specifically were designed to fit the hand of the particular wearer shown in order to increase comfort. Additionally the discomfort that may be present in other linkage based systems due to joint misalignment is not present since the finger itself is part of the linkage mechanism. The revolute joints as shown in FIGS. 2A-B were realized with acetal pins 64.

Embodiment Testing

Figures 7A, 7B, 7C, 7D, 7E, 7F:
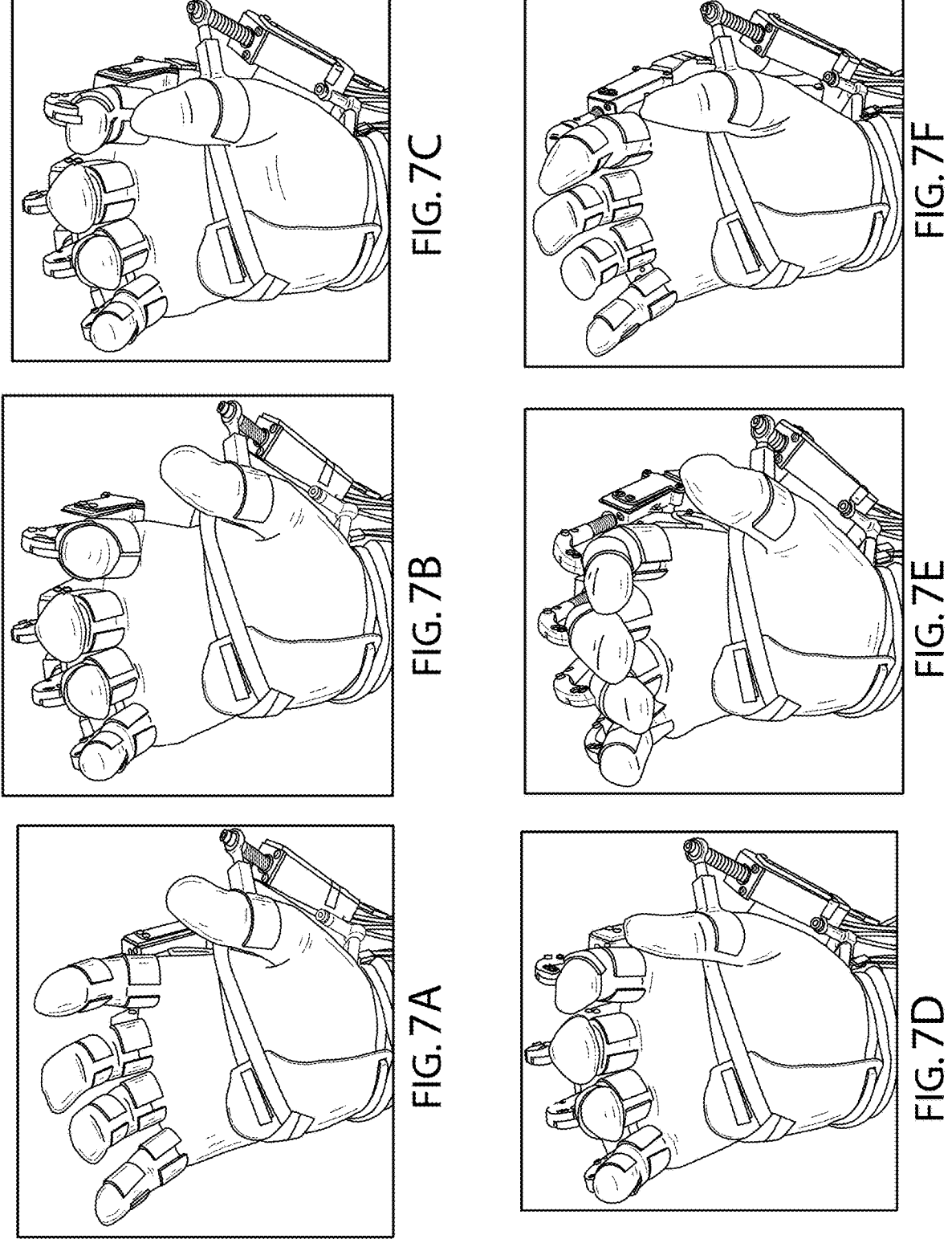
FIGS. 7A-AG are depictions of a user wearing the device according to an embodiment of the invention in each of the 33 configurations of the GRASP taxonomy.
Figures 7G, 7H, 7I, 7J, 7K, 7L:
Figures 7M, 7N, 7O, 7P, 7Q, 7R:
Figures 7S, 7T, 7U, 7V, 7W, 7X:
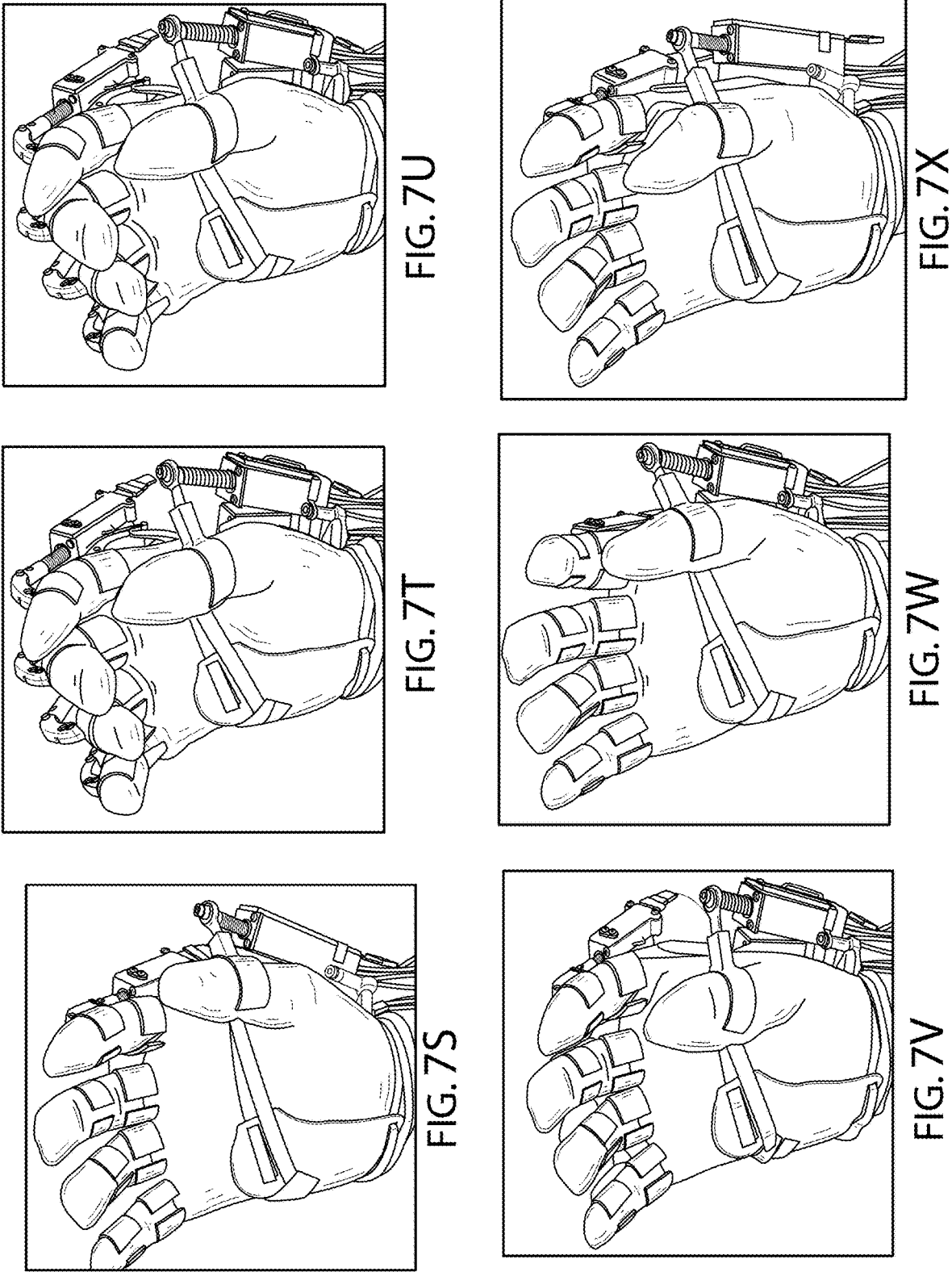
Figures 7A, 7Y, 7Z:
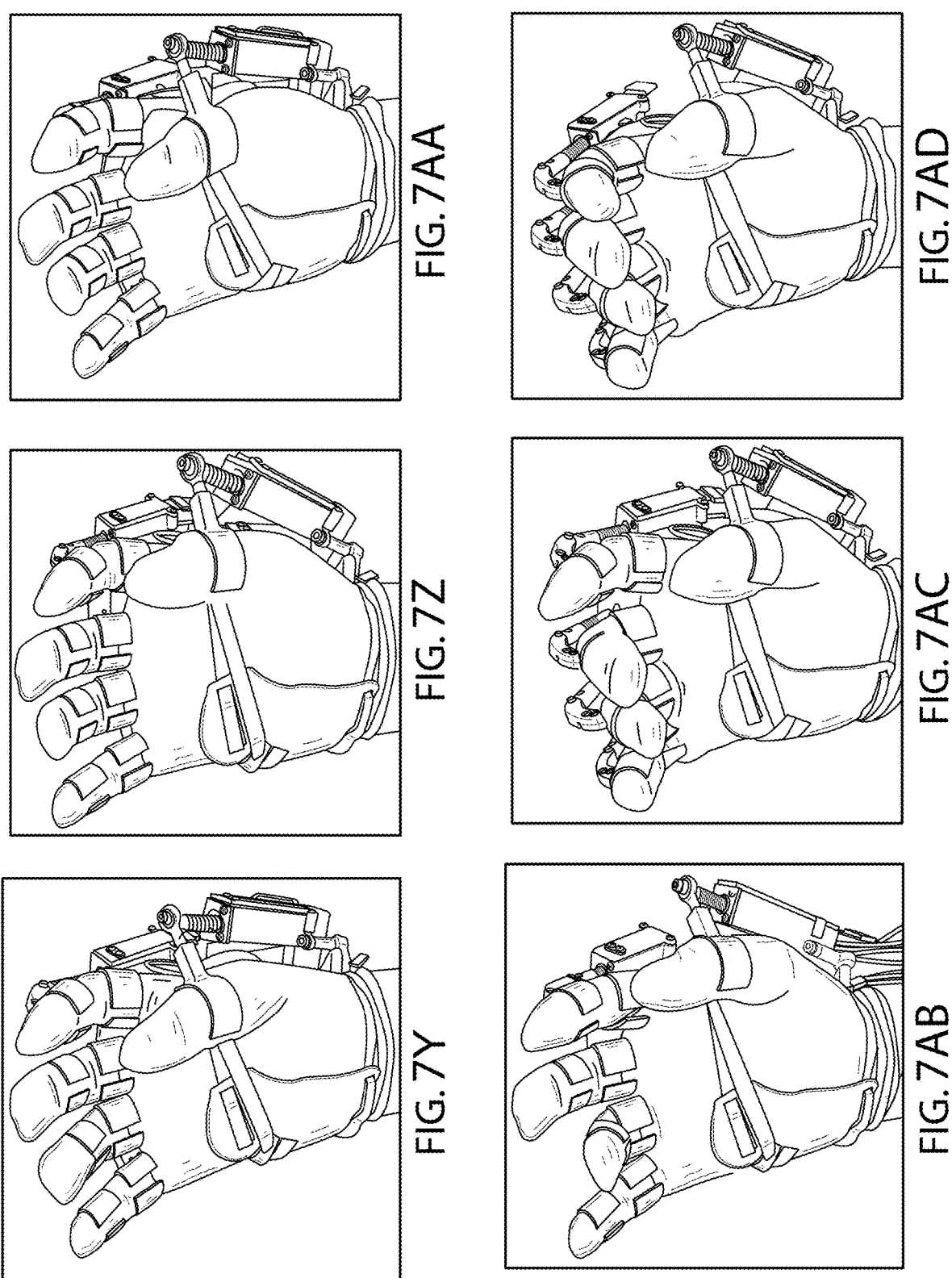
Figure 7A:
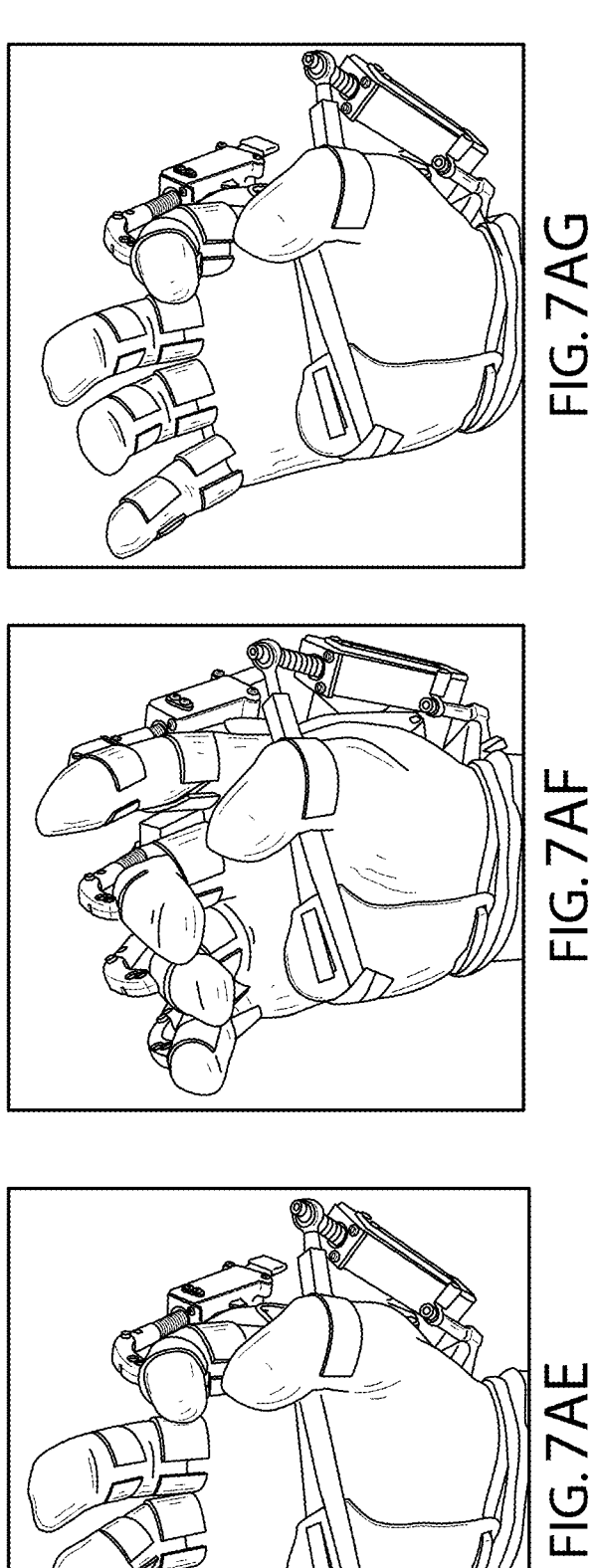

The primary contribution of the exoskeleton design is that it is able to achieve the wide variety of necessary grasps without the need to conform to an object. The glove, as worn by the same user as before, was commanded to execute each of the 33 grasps in the GRASP taxonomy (see "The GRASP Taxonomy of Human Grasp Types" IEEE Transactions on Human-Machine Systems, Vol. 46, No. 1, February 2016, pages 66-77, which is incorporated by reference herein in its entirety) (FIGS. 7A-AG). For example, FIGS. 7A-7C demonstrate a cylindrical grasp, which relies on coordinated flexion of joints in the hand starting from an open position. An index finger extension grasp is shown in FIG. 7Q, which involves flexion of the middle, ring, and pinky fingers but extension of the index finger. Further, for example, FIG. 7AG shows a ring grasp that involves flexion of the index finger and thumb but extension of the middle, ring, and pinky fingers. In embodiments, the controller relies on user inputs (e.g., user inputs from any one or more of the user applying some force in initiating, implementing, and/or accomplishing the grasp) to assist the user in performing all or a portion of and/or accomplishing the grasps of FIGS. 7A-AG.

Figures 8A, 8B, 8C, 8D, 8E, 8F:
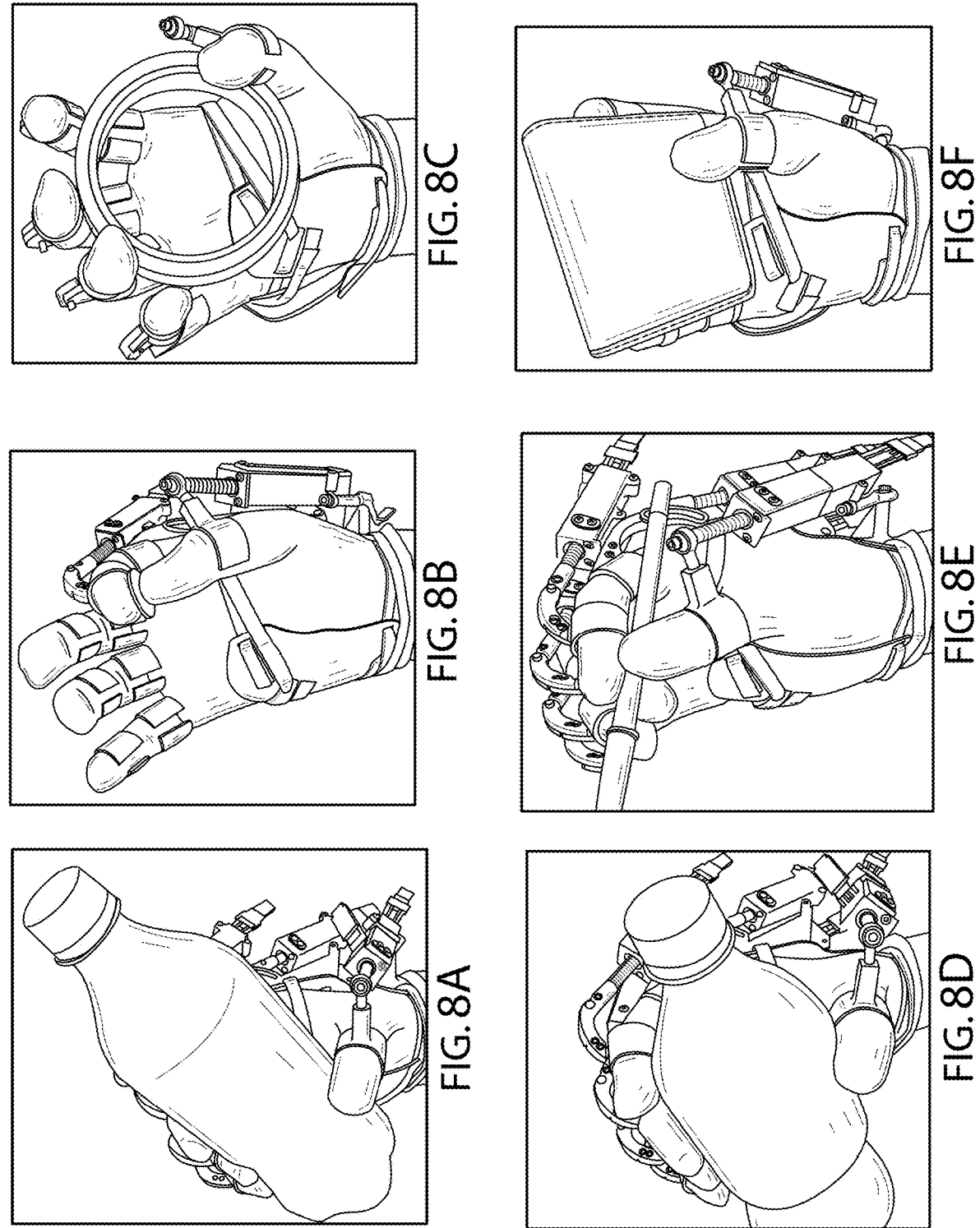
FIGS. 8A-F are depictions of a user wearing the device according to an embodiment of the invention demonstrating seven unique grasps for holding objects including: a bottle (A, D), a coin (B), a roll of tape (C), a pen (E), and a wallet (F).

The utility of the device in providing grasping assistance for activities of daily living was then demonstrated by using the device to grasp different objects (FIGS. 8A-F). FIGS. 8A and 8C show the device providing assistance in grasping a bottle using a large diameter grasp (FIG. 8A) and an index finger extension grasp (FIG. 8C). FIG. 8B shows a palmar pinch grasp used to hold a coin between the index finger and thumb. FIG. 8C shows a power disc grasp used to hold a roll of tape. FIG. 8E shows the writing tripod grasp used to hold a pen. FIG. 8F shows a parallel extension grasp used to hold a wallet.

Motion Amplification Testing

Figure 9:
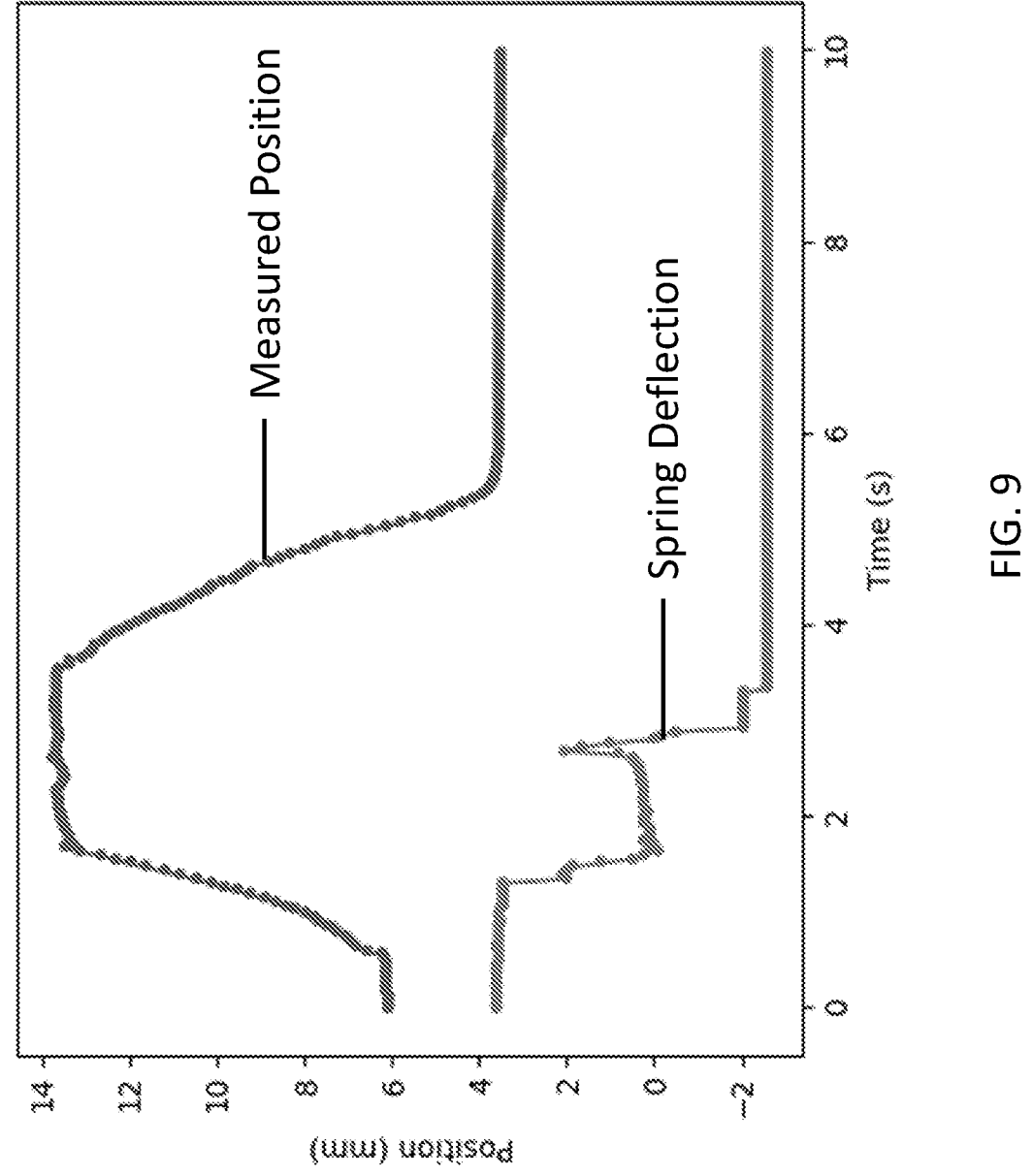
FIG. 9 is a graph showing the trajectory of the index finger PIP joint and the spring deflection with the wearer attempting a single flexion and extension.
Figure 10:
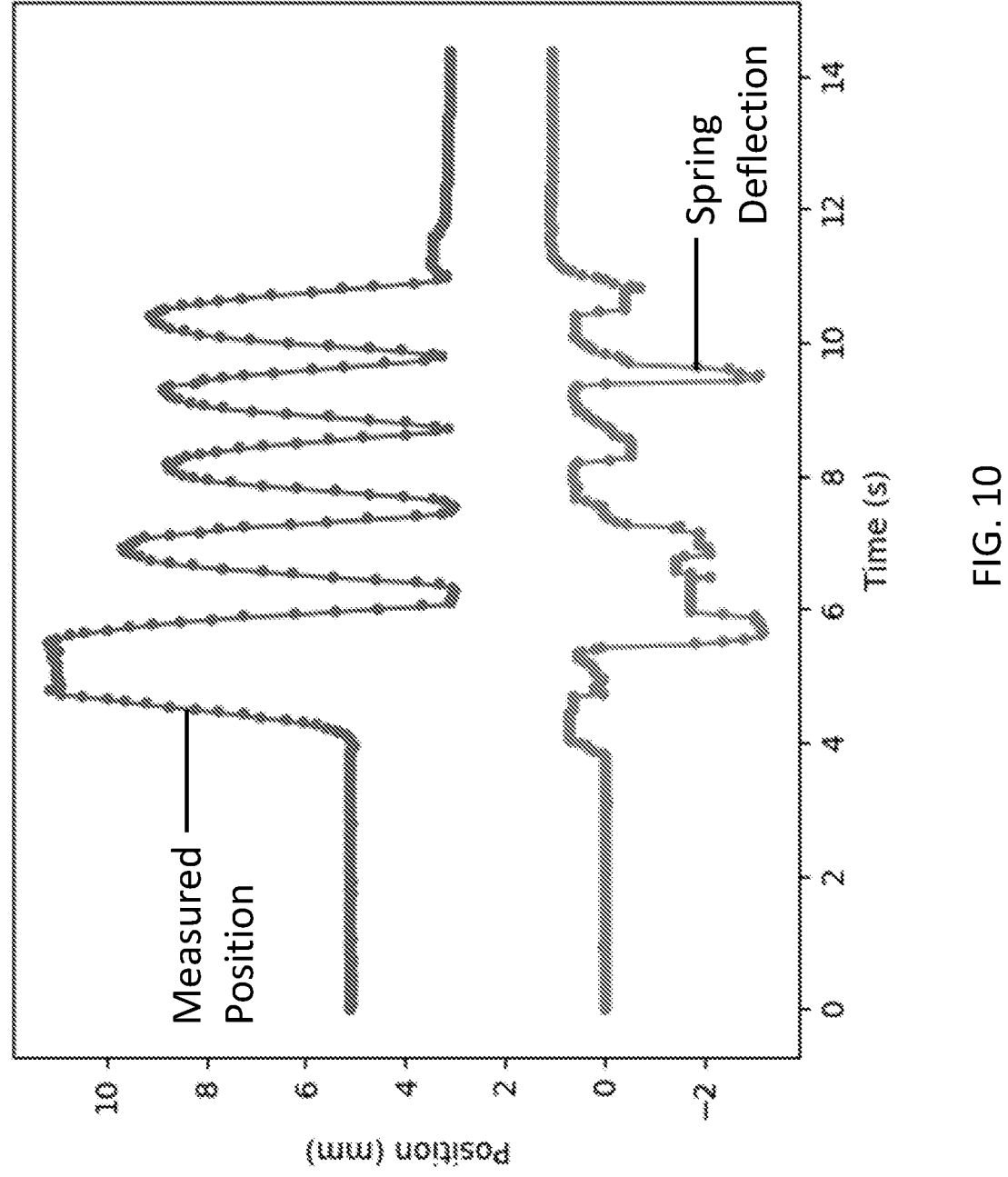
FIG. 10 is a graph showing the trajectory of the index finger PIP joint and the spring deflection with the wearer attempting a sinusoidal motion.

The motion amplification controller was designed for the bidirectional motion of the finger joints. Since the previous tests focused on flexion of the finger joint and then stopping once the desired configuration was reached, a test was conducted to verify the ability of the system to reverse direction. The results of this test are shown in FIGS. 9-10. The wearer alternatingly flexed and extended their index finger PIP joint. In FIG. 9, a single flexion and extension are performed, while in FIG. 10, repeated flexions and extensions are shown. The actuator target position, measured position, and spring deflection are shown. It can be seen that the direction of motion of the actuator matches the spring deflection, the magnitude exceeds the displacement of the spring, and that changes in the spring displacement are quickly matched by the actuator. Additionally, there is no trouble stopping the motion as seen by the actuator position at the start and end of the motion. The ability of the glove to stop quickly is positively affected by the shifting reference added to the motion amplification controller.

Figure 11:
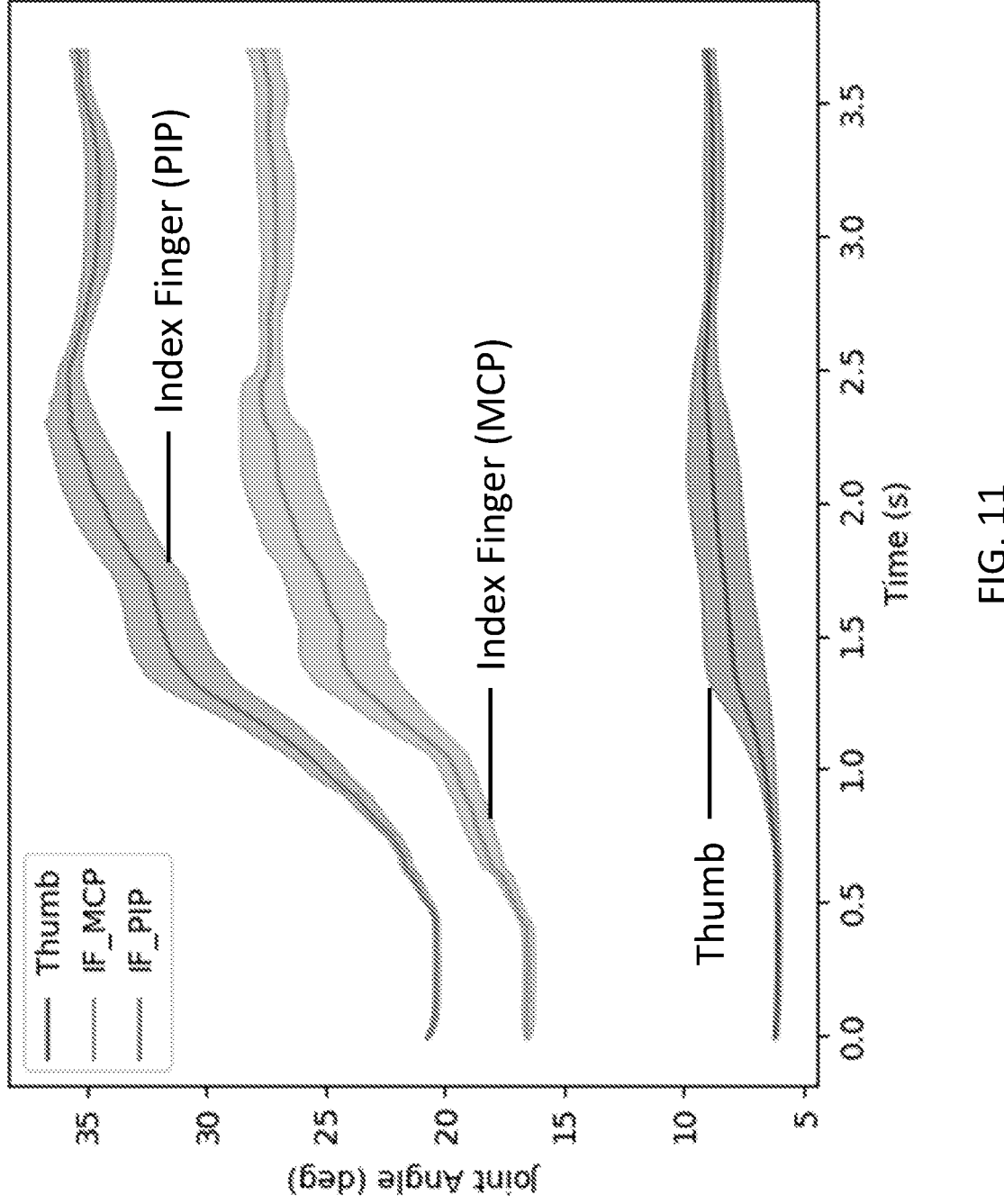
FIG. 11 is a graph showing the trajectory of the index finger and thumb when attempting a tip pinch using the motion amplification controller. The mean is shown as a solid line and a standard deviation is shown as the shaded region.

In order to illustrate the repeatability of the glove with the motion amplification controller, Grasp 9 (FIG. 71) was tested since it contained a mix of flexed and un-flexed joints. The grasp was performed 15 times on the coin as shown in FIG. 8B. The mean and a single standard deviation are shown. As shown, there is large flexion along both index finger joints and the thumb. It can be seen that motion is consistent and easy to control. The wearer attempted, each trial, to perform the grasp in three seconds. The trajectories of the index finger and thumb when attempting this grasp using the motion amplification controller are shown in FIG. 11. The means are shown as solid lines and the standard deviations are shown as shaded regions.

This work contributed the design of an exoskeleton glove capable of assisting in dexterous grasping operations using a motion amplification controller. The glove itself was designed to perfectly/comfortably fit the hand of a specific individual and is capable of independent motion of the MCP and PIP joints of the IMRL fingers and flexion along the thumb as a whole. Actuation is accomplished by SEAs which allow deflection of the glove by the wearer. This deflection is used to inform a motion amplification controller to help the wearer complete their intended grasping motions.

The motion amplification controller implements a virtual spring-mass-damper system, the glove can amplify the input motion to provide assistance. The virtual spring is responsible for amplifying the motion while the nonlinear damper prevents the system from traveling beyond the natural ROM of the finger joints. The input into the system is through the deflection of the springs in SEAs that are used to control the finger joints.

Tests were performed in order to validate this functionality. The first was the completion of 33 grasps in the GRASP taxonomy. Each grasp was executed while the exoskeleton was being worn. It was observed in the execution of those grasps that many of these grasps are similar to each other kinematically, and their distinction comes from their interaction with objects. Specific attention was paid to grasps that featured unique kinematic configurations. These grasps were repeated with objects pertinent to the grasp, using the motion amplification controller. Flexion and extension motions of a finger joint were tested to observe the relationship between the displacement of the spring in the SEA and the motion of the actuator. Finally, the motion amplification controller was tested multiple times on one of the unique grasps to ensure the repeatability of the control for a specific grasp.

Example 1: Grasp Assistance for Holding a Bottle (GRASP Taxonomy Grasp #1)

A user wearing the device according to an embodiment of the invention reaches toward a bottle with the hand in a natural, relaxed position. With the hand in an open position around, but not touching, the bottle, the user provides movements in the thumb and the fingers to initiate the grasp motion. The initial movements are felt/sensed by the motion amplification controller, which receives the user's intent from the initial movements and instructs the actuator to move the thumb from an adducted position to an abducted position. As each finger deflects while performing the grasp, the controller is informed of the user's intention and assists in curling the thumb and fingers around the bottle. The motion amplification controller accordingly instructs one or more of the series elastic actuators to amplify the user's movement.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Any of the methods disclosed herein can be used with any of the devices/systems disclosed herein or with any other devices/systems. Likewise, any of the disclosed devices/systems can be used with any of the methods disclosed herein or with any other methods. Other embodiments of the invention will be apparent to those skilled in the art from consideration of the specification and practice of the invention, such as modifying the device according to a particular user's needs.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:
1. A hand exoskeleton device comprising:
a dorsum base and palmer base adapted for use with a wearer's hand;
a first phalanx pad and a second phalanx pad;
a first actuator in operable communication with the first phalanx pad and the dorsum base, and a second actuator in operable communication with the second phalanx pad and the first actuator;
wherein the first actuator is in operable communication with the first phalanx pad by way of a first linkage length connected with a first revolute joint connected with a second linkage length connected with a second revolute joint connected with a third linkage length connected with the first phalanx pad;
wherein the first actuator is in operable communication with the second actuator by way of a third revolute joint;
wherein the second actuator is connected to a fourth linkage length connected to a fourth revolute joint connected to a fifth linkage length connected to the second phalanx pad; and a motion amplification controller in operable communication with the first and second actuators and capable of controlling movement of one or more finger(s) or a thumb of the wearer's hand.

2. The device of claim 1, wherein the first or second actuator is a series elastic actuator.

3. The device of claim 1, wherein the first and second actuators are disposed in a manner capable of being in operable communication with one finger of the wearer's hand.

4. The device of claim 3, wherein the first actuator is disposed in operable communication with the first phalanx pad in a manner to affect a metacarpophalangeal joint of a finger of the wearer and the second actuator is disposed in operable communication with the second phalanx pad in a manner to affect a proximal interphalangeal joint of the finger of the wearer.

5. The device of claim 1, further comprising a thumb actuator affecting a carpometacarpal flexion joint and a metacarpophalangeal joint of a thumb of the wearer's hand.

6. The device of claim 1, wherein the adduction/abduction degrees of freedom of all fingers of the wearer's hand are passive and located on the dorsum base.

7. The device of claim 1, further comprising a glove configured for indirectly affixing the device to the wearer's hand.

8. The device of claim 1, wherein the motion amplification controller is configured to enforce one or more equations of motion on one or more of the actuator(s).

9. The device of claim 8, wherein the motion amplification controller is configured to determine a force needed to move one or more finger(s) or thumb of the wearer's hand.

10. The device of claim 1, wherein the motion amplification controller is configured to control movement of one or more finger(s) or a thumb of the wearer's hand.

11. The device of claim 10, wherein the motion amplification controller is configured to amplify an input motion from the wearer's hand, providing assistance in grasping an object.

12. The device of claim 1, wherein the motion amplification controller is capable of reversing direction and is capable of ceasing movement upon either a lack of continued input from the wearer or input in the direction opposite current motion.

13. The device of claim 12, wherein the motion amplification controller comprises a virtual sliding spring base to enable the reversing and/or ceasing of movement.

14. The device of claim 13, wherein spring deflection, alpha, autonomously approaches zero.

15. The device of claim 1, wherein smooth operation of the device is enabled by a nonlinear damping manifold, beta, which allows the device to smoothly observe a natural range of motion of the wearer in that the nonlinear damping manifold is capable of providing infinite resistance as any finger joint attempts to exceed its limits.

16. The device of claim 1, further comprising:
up to four finger mechanisms, each comprising:
    the first and second phalanx pads;
    the first and second actuators; and
    the first, second, third, fourth and fifth linkage lengths and the first, second, third and fourth revolute joints;
a thumb mechanism comprising:
    a thumb base;
    a thumb phalanx pad; and
    a thumb actuator disposed in operable communication with the thumb phalanx pad and the base.

17. The device of claim 1, wherein the motion amplification controller is configured to impart the following equations of motion on one or more actuator:

$$\dot{x}_1 = x_2;\ \dot{x}_2 = -\alpha x_1 - b(\vec{x})x_2 \quad \alpha > 0$$

$$b(\vec{x}) = \frac{\exp\left(\tan^{-1}(-x_1')\tan^{-1}(x_2)\right)}{x_{1max}' - |x_1'|}$$

$$\dot{\vec{x}} = \begin{bmatrix} 0 & 0 & 1 & 0 \\ -\alpha & -b(\vec{x}) & \alpha & 0 \\ 0 & 0 & 0 & 1 \\ \alpha & 0 & -\alpha & -\beta \end{bmatrix}\begin{bmatrix} x_1 \\ x_2 \\ x_3 \\ x_4 \end{bmatrix}$$

wherein $x_1$ is a spring deflection in the actuator and $\alpha$ is a virtual spring constant;

wherein the spring deflection is calculated as $x_1'\text{-}x_{1ref}'$, and wherein $b(\vec{x})$ is a nonlinear damping term.

* * * * *